United States Patent [19]

Adell

[11] Patent Number: 4,559,741
[45] Date of Patent: Dec. 24, 1985

[54] METHOD OF MAKING EDGE GUARD

[75] Inventor: Robert Adell, Sunnyvale, Tex.

[73] Assignee: U.S. Product Development Co., Sunnyvale, Tex.

[21] Appl. No.: 544,908

[22] Filed: Oct. 24, 1983

Related U.S. Application Data

[63] Continuation-in-part of Ser. No. 533,687, Sep. 19, 1983.

[51] Int. Cl.$^4$ .................................................. E05F 7/00
[52] U.S. Cl. .................................. 49/462; 156/244.11
[58] Field of Search ........................ 49/462; 52/716; 156/244.27, 244.11; 264/171, 174, 285, 339

[56] References Cited

U.S. PATENT DOCUMENTS

| 2,887,338 | 5/1959 | Adell | 49/462 |
| 3,811,989 | 5/1974 | Hearn | 156/244.27 X |
| 4,372,083 | 2/1983 | Hatzikelis et al. | 49/462 |

Primary Examiner—Kenneth Downey
Attorney, Agent, or Firm—Stephenson and Boller

[57] ABSTRACT

Various edge guards and their methods of manufacture are disclosed. The edge guards and methods relate to improved procedures for manufacturing of edge guards so as to provide various forms of product improvements. The methods and edge guards are directed to the objective of providing an edge guard which resists electro-chemical corrosive action when mounted on an edge. This can be done by an insulated metal edge guard or by an edge guard of entirely non-metallic construction.

11 Claims, 28 Drawing Figures

4,559,741

METHOD OF MAKING EDGE GUARD

REFERENCE TO PARENT APPLICATION

This application is a continuation-in-part of pending application Ser. No. 533,687, filed Sept. 19, 1983.

BACKGROUND AND SUMMARY OF THE INVENTION

This invention relates to edge guards of the type which are applied to the trailing edges of swinging closures such as the trailing edges of automobile doors.

A number of applicant's issued patents and pending applications relate to insulated metal edge guards. Examples of these are disclosed in U.S. Pat. Nos.

| | | |
|---|---|---|
| 4,259,812 | 4,338,148 | 4,379,376 |
| 4,316,348 | 4,365,450 | 4,379,377 |
| 4,334,700 | 4,377,056 | 4,387,125 | as well as in pending patent applications.

Self-retaining insulated metal edge guards are advantageous because of the excellent retention, performance, and appearance characteristics. Such insulated metal edge guards have protective insulation disposed between the points at which the self-retention force is applied to opposite sides of the door edge so as to insulate the metal of the edge guard from the painted metal of the door. They also are advantageous in that they permit the exterior of the edge guard to be exposed to view so as to present a bright metallic appearance.

It may be deemed desirable in certain instances to provide a decorative contrast to selected regions of an edge guard, for example, along the outboard edges of the legs of the edge guard. Thin bands running along these regions lengthwise of the edge guard provide a decorative appearance which is desired in certain instances to provide coordination with the metal of the edge guard and/or with the painted door. The color of these bands may be made to match and/or contrast with the color of the door and/or the metal.

The present invention in one respect is directed to a new and improved method for making a door edge guard of this type. With the present invention, it is unnecessary to stock various laminated coils of metal, each of which contains a particular color lamination. Rather, the procedure contemplates that only a basic metal edge guard be manufactured and that the decorative material be applied to the edge guard from extruded plastic strips. This saves on the manufacturing and inventory costs associated with manufacturing of edge guards.

According to previous practice, insulated edge guards are manufactured by laminating a sheet of plastic material to a coil of metal, slitting the laminated metal into strips of desired width, and then forming the strips into the desired U-shaped cross section through roll-forming procedures. Where various color properties are desired, it was necessary to fabricate numerous coils of material with the different colors required.

With the present invention, as explained above, the insulated metal channel may be formed into the desired configuration and then subsequently when the desired color characteristics, either matching or contrasting, are chosen, they may be imparted to the metal channel by selection from rolls or strips of extruded vinyl which are then assembled to the edge guard. It is, however, possible to assemble these strips in association with the fabrication procedure for fabricating the metal into the desired cross sectional shape if that is desired.

In another respect the present invention relates to the selective coloration of edge guards, be they metal or otherwise, and this also avoids the need to fabricate and stock a large inventory of different colored laminated coils. One embodiment contemplates the fabrication of an entirely non-metallic edge guard having outer coloration imparted by a fluorocarbon plastic film on a non-metallic body of shock-absorbing material.

Other features of the invention will be seen as the description proceeds.

The invention is disclosed in the ensuing description, claims and accompanying drawings. The drawings disclose a preferred embodiment of the invention according to the best mode contemplated at the present time in carrying out the invention.

DESCRIPTION OF THE PREFERRED EMBODIMENT

Figure 1:
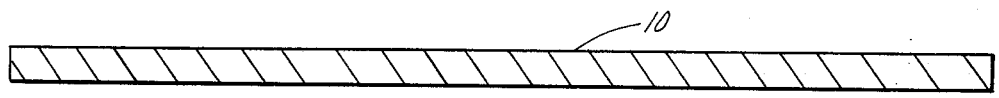
FIGS. 1 and 2 are cross sectional views illustrating the first two steps in the method of the invention.
Figure 2:

FIGS. 1 and 2 illustrate the first two steps in a first embodiment of the method of the invention. The starting point is with a sheet or strip of metal 10. Any suitable metal will do, stainless steel and aluminum being preferred materials.

Figure 3:
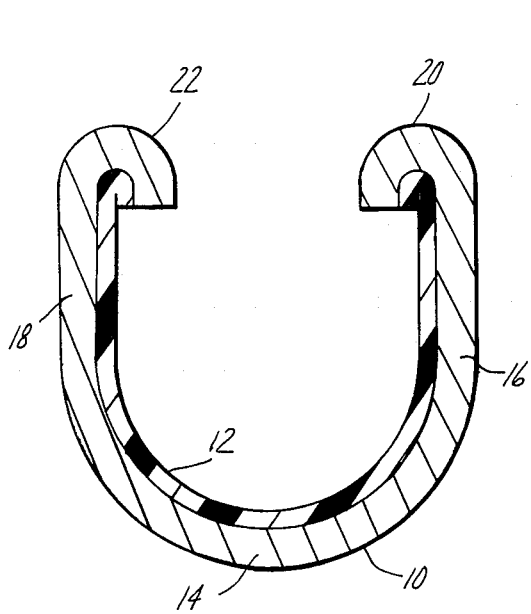
FIGS. 3 and 4 are cross sectional views illustrating further steps.

Applied to one surface of the metal strip 10 is a layer of insulation 12. This insulation layer may be applied in any suitable manner but the preferred technique involves the application by spraying, or roll-coating of a thin film of insulating material. This is the most economical way to achieve the insulation and it does not require the procedure of laminating a sheet of plastic material to the metal as described in other of applicant's patents and patent applications. The material in FIG. 2 is then formed into the desired cross sectional shape such as that shown in FIG. 3. The cross sectional shape illustrated in FIG. 3 is in the form of a general U-shape comprising a semi-circular base 14 and legs 16 and 18 extending away from base 14. The distal end margins of the legs are reverse turned inwardly to form beads 20 and 22 at the distal ends of the respective legs 16 and 18.

The cross section is formed such that the insulation 12 lines the interior of the U-shaped cross section. This insulating material is intended to protect against galvanic action between the metal of the edge guard and the painted metal edge onto which the edge guard is to be installed. It is not necessarily intended to be a cushioning or shock absorbing layer but it could be so if desired. The metal edge guard is of the self-retaining type with the self-retention force being applied by the beads 20 and 22 to opposite sides of the edge on which the edge guard is installed.

Figure 4:
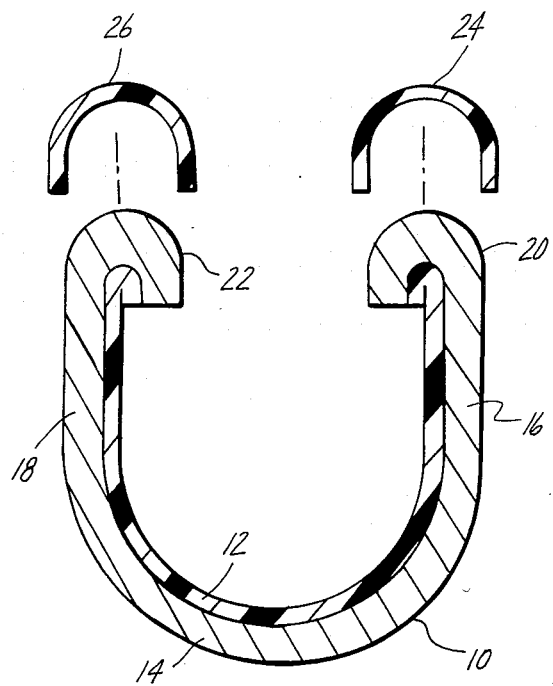

In order to further insulate the metal of the beads from the painted edge and to impart a desired color as explained above, a strip is applied to each of the beads. This is shown in FIG. 4 wherein applied to each bead is an extruded plastic strip 24, 26 having an inverted U-shape corresponding to the shape of the bead. The material is any suitable insulating material, for example, plastic such as polyvinyl chloride. This material comes in extruded form and in various colors so that any desired color may be added to the metal channel as required. It will be noted that because the insulation 12 is on the interior, it has no effect on the outward appearance of the edge guard.

The strips 24 and 26 are preferably secured to the beads by additional means or procedures such as adhesive, or some form of bonding, or even mechanically. The techniques described in other of applicant's issued patents and pending applications may be used for this purpose.

Figure 5:
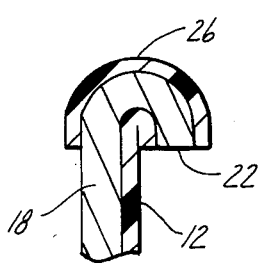
FIG. 5 is an enlarged view of a portion of a completed edge guard.
Figure 5A:
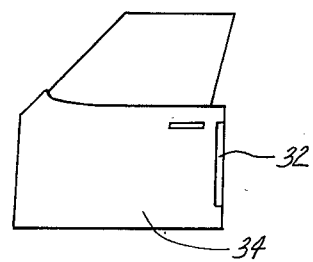
FIG. 5A is a side elevational view of an edge guard installed on the trailing edge of a door.

FIG. 5 is a fragmentary view illustrating the final construction at the end of one of the beads. It can be seen that the insulation covers the beads at the points where they exert self-retention force on the door edge. Also, the inserts extend around onto the outside of the legs so as to present a band of material running along the outboard edges of the legs. In the case of the outboard leg, when the edge guard is installed on a vehicle door edge, this will provide a band of material running along the forward outboard edge of the outer leg which may match and/or contrast with the color of the door and/or the metal of the edge guard. FIG. 5A shows a completed edge guard 32 installed on the trailing edge of a vehicle door 34.

Figure 6:
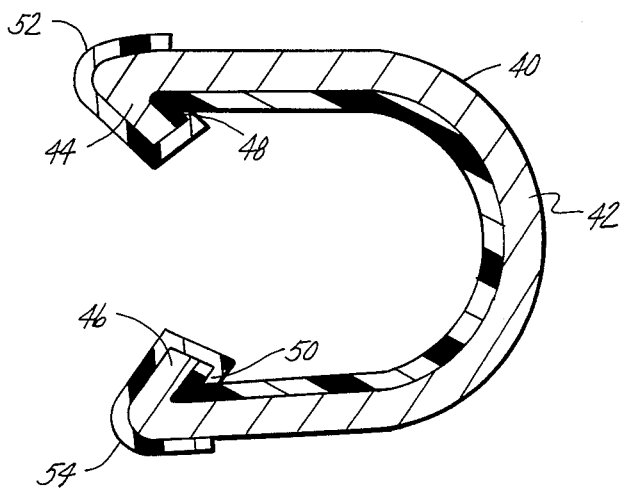
FIG. 6 is a transverse cross sectional view illustrating another embodiment of completed edge guard.

FIG. 6 illustrates another embodiment of edge guard which is constructed in accordance with principles of the invention. This embodiment is designated by the general reference numeral 40, and it comprises a metal U-shaped channel 42 with an insulating layer 12 lining the interior. The ends of the legs are formed with barbs 44, 46 respectively by being reverse turned inwardly to the illustrated configuration. A crevice 48, 50 exists between each inwardly turned barb 44, 46 and the respective leg. Strips for covering the distal ends of the legs, and identified by reference numerals 52, 54 fit onto the ends of the legs. These have the cross sectional shapes illustrated, with one marginal edge fitting into the crevices 48 and 50. Although this serves to mechanically interlock the strips with the respective legs, it is still desirable nonetheless to include an additional means of attachment such as an adhesive or a bonding procedure. The edge guard of FIG. 6 exerts the self-retention force through the protective medium of the strips, yet the strips provide the decorative appearance matching or contrasting with the door and/or metal of the edge guard.

Figure 7:
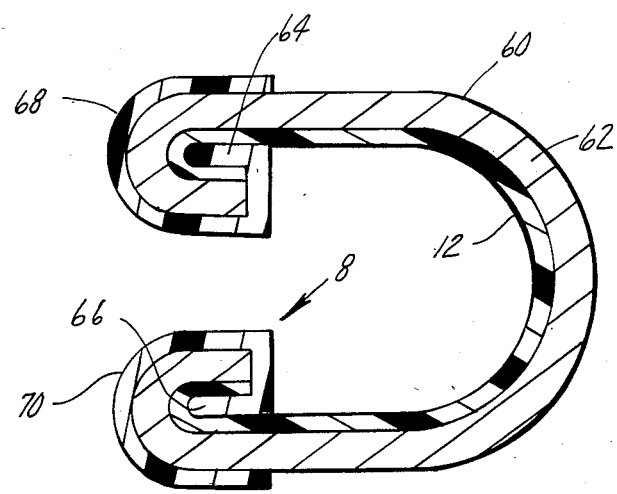
FIG. 7 is a cross sectional view illustrating a third embodiment of completed edge guard.

FIG. 7 illustrates a third embodiment 60. It comprises a metal channel 62 formed to the illustrated cross sectional shape with insulating liner 12 on the interior. The ends of the legs are reverse turned in a different manner from the preceding embodiments so as to leave crevices 64 and 66 more open. The strips 68 and 70 are shaped such that one marginal edge fits into the corresponding crevice. This serves to interlock each strip with each leg. Each strip wraps fully around to the outside so as to present the decorative contrasting and/or matching appearance on the outside of the leg. Once again it is preferable to use an additional attachment means and/or procedure to secure the strips in place. It would also be possible if desired to subject the metal to a further operation after the inserts have been installed by further closing the inwardly turned beads to in effect clamp the edges of the strips which are inserted into the crevices 64 and 66. This could provide a more forceful retention.

Because the metal edge guard is often contoured to conform to a sweep or contour in the door edge, it may be desirable to include provisions in the strips which would be useful in more closely conforming the inserts to the curvature at the distal ends of the legs which follow the curvature of the door.

Figure 8:
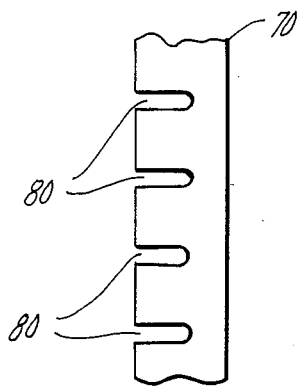
FIG. 8 is a fragmentary view looking in the direction of arrow 8 in FIG. 7 and enlarged.
Figure 9:
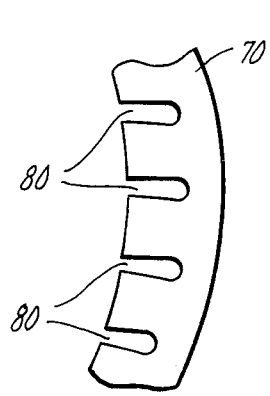
FIG. 9 is a view similar to FIG. 8.

FIG. 8 illustrates the free condition of a typical insert in which the region of the insert which extends into the crevice and around the bead is provided with a series of notches 80 at suitable intervals along the length. The notches allow the insert to be conformed to a contour such as that depicted in FIG. 9 and/or in a plane which is perpendicular to the plane of the sheet containing FIG. 9. The shape, size and even the necessity of notches will depend upon the nature of the particular requirements meaning the dimensions involved and the extent of the contour. It is possible that the notches may extend only partially into the insert or they may extend even more fully into the crown where it wraps around the end of the leg.

Figure 10:
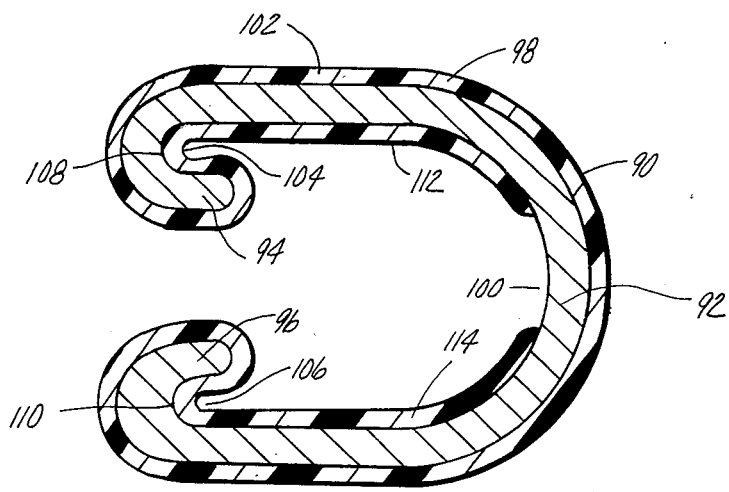
FIG. 10 is a cross sectional view of a further embodiment of edge guard.

FIG. 10 illustrates a further embodiment of edge guard 90. Edge guard 90 comprises a metal channel 92 formed into a general U-shape with the ends of the legs being turned inwardly to form beads 94 and 96. A one piece insulating insert 98 is fitted onto the metal channel and is in the form of a separate extrusion. The insulating insert 98 covers the entirety of the cross section except for a gap 100 on the interior of the U-shaped channel at the base.

The insulating insert comprises a U-shaped exterior portion 102 for the exterior of the metal channel. This U-shaped exterior portion continues around the beads at the distal ends of the legs of the metal channel and includes interlocking portions 104, 106 respectively which interlock within the crevices 108, 110 between the beads 94, 96 and respective legs of the metal channel. From these interlocking portions, the insulating insert continues along the inside of each leg at 112, 114 respectively and partially extends into the base of the U leaving the gap 100.

The insulating insert is extruded to a shape which allows it to be fitted onto the metal channel so as to interlock the portions 104, 106 with the respective crevices 108, 110. The insert could be extruded to substantially the illustrated cross sectional shape or it could be extruded to a somewhat different shape. For example, instead of extruding the insert to the illustrated cross sectional shape, it could be extruded with a different shape so as to require folding about the base of the U and in this way it could exert its own self-retention force when assembled onto the metal channel.

Figure 11:
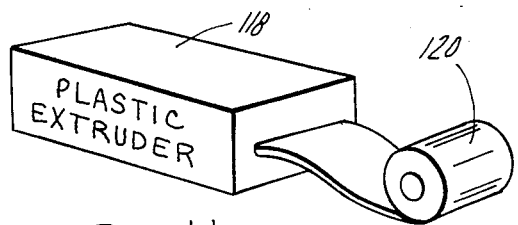
FIGS. 11, 12 and 13 are perspective views illustrating portions of respective procedures for fabricating edge guards.
Figure 12:
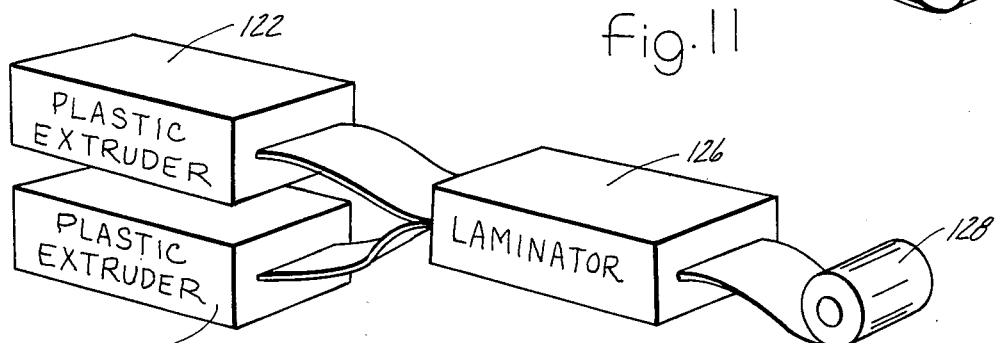
Figure 13:
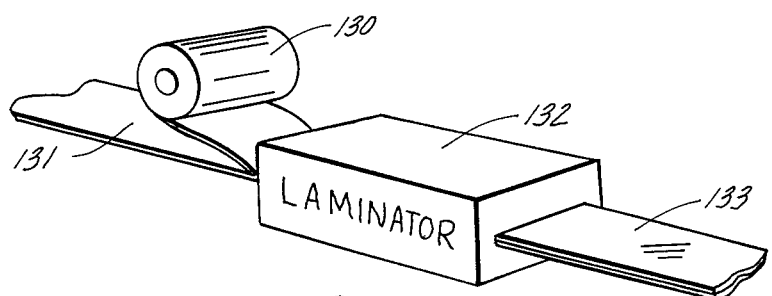

FIGS. 11, 12 and 13 illustrate steps in manufacturing procedures which illustrate economy in the manufacturing procedure.

FIG. 11 illustrates plastic material for use in insulating the metal edge guard being obtained from an extruder 118. The material is wound into rolls 120 and the rolls may be manufactured in desired colors. When a particular color is needed, material is taken from the roll of that color.

FIG. 12 illustrates a procedure in which two plastic extruders 122, 124 provide two different extrusions which are laminated together by a laminator 126 and with the laminated material being wound into a roll 128.

FIG. 13 illustrates plastic material being taken from a roll 130 and laminated onto metal 131 by a laminator 132 to form a laminated metal 133.

For the FIG. 10 embodiment, care should be taken in selection of the material of the metal of the edge guard and its installation because the interior is not fully lined with insulation by virtue of the gap 100. FIG. 10 shows one specific embodiment and for any given embodiment dimensions of the insert may be adjusted as appropriate for fabrication and installation purposes.

Figure 14:
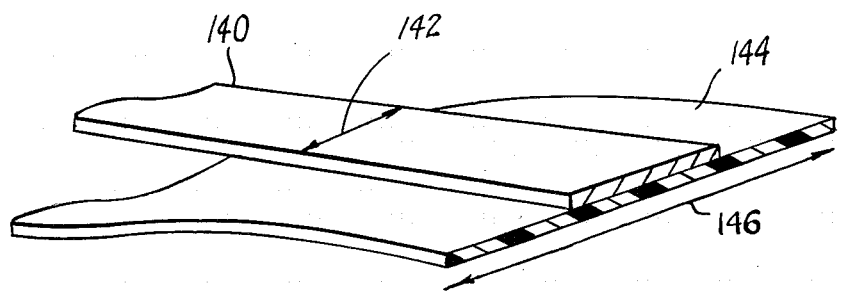
FIG. 14 is a perspective view of one step in another method of fabrication.
Figure 15:
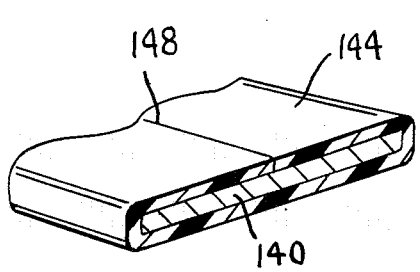
FIGS. 15 and 16 are fragmentary perspective views of different embodiments after completion of the step of FIG. 14.
Figure 16:
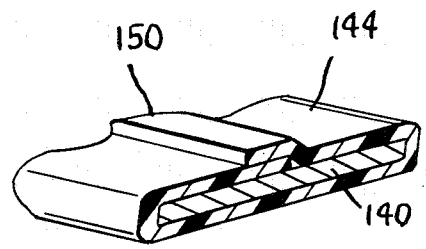

FIG. 14 illustrates a step in another practice of the present invention. A base strip of metal, or other suitable material, 140 is provided with a desired width 142 so as to provide enough material for the cross sectional shape into which the strip will be subsequently formed to make the edge guard. An insulating film 144 is also provided which has a width 146 greater than the width 142 of strip 140 so as to allow the strip to be completely enveloped in either of two ways as illustrated by FIGS. 15 and 16. The film is provided with a desired color characteristic.

As can be seen in FIG. 15 the width 146 is such that when the strip 140 is enveloped by the film 144, the edges of the film form an abutting longitudinal seam 148. In FIG. 16 the width of the film is such that when the metal 140 is enveloped, the ends of the film form an overlapping longitudinal seam 150. The film may be any suitable material possessing the desired color and physical properties. Polyvinylchloride films are suitable in certain instances while for other applications, fluorinated carbon plastic films are appropriate. Certain fluorocarbon plastic films, a polyvinylfluoride film for example, possesses excellent color characteristics and abrasion resistance. The bonding of the film to the base material 140 may be accomplished by any suitable means. For example, adhesive bonding, chemical bonding, induction heating, ultrasonic bonding, etc., are examples of suitable techniques.

Figure 17:
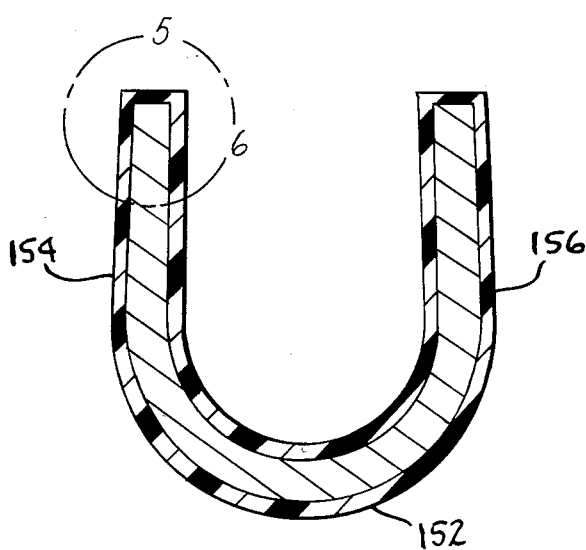
FIG. 17 is a transverse cross sectional view through a completed edge guard made from the embodiment of FIG. 15.

The encapsulated strips such as those illustrated in FIGS. 15 and 16 are subsequently processed by conventional means to form them to desired cross sectional shapes. An example of a typical shape is illustrated in FIG. 17. The shape is a general U-shaped cross section having a generally semi-circular base 152 and legs 154, 156. Leg 154 is the outer leg and leg 156 is the inner. Other cross sectional shapes are however possible. The edge guard may be self-retaining in the same manner as other of applicant's self-retaining edge guards or it may be installed on an edge through the use of any suitable mounting procedure including those referred to above.

In the embodiment shown in FIG. 17, the U-shaped section is formed such that the seam 148 is on the interior of the U-shaped cross section. In this way the seam will not be exposed to view from the exterior where it might be deemed objectionable. However, it is possible within the scope of the present invention for the seam to be in other than the illustrated location.

Figure 18:
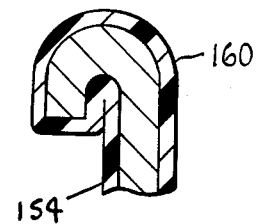
FIGS. 18 and 19 are views in circle 18–19 in FIG. 17 illustrating modifications.
Figure 19:
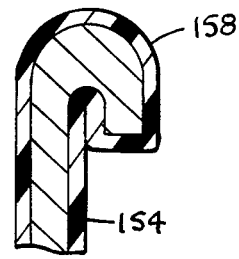

FIGS. 18 and 19 illustrate modifications which may be made to one or both of the legs at their distal ends. FIG. 18 illustrates the formation of a bead 158 on the outer leg 154. The bead 158 is formed by reverse turning inwardly the distal end of the leg along the entire length of the channel.

Similarly, FIG. 19 illustrates the formation of a bead 160 on the end of leg 154 which is formed by turning the distal end of the leg outwardly back onto itself along the entire length of the channel.

The use of beads is often desirable for stiffening purposes to improve the retention characteristics of the edge guard on the edge, particularly for entirely self-retaining edge guards. It will be observed that in all embodiments, the material 140 is fully enclosed around its sides by the insulating material so that the color of the film 144 is always presented to an observer.

In the case of the fluorocarbon plastic film, certain desirable color attributes are obtained and the fluorocarbon plastic material provides excellent toughness and resistance to abrasion.

If it is not possible to bond a film directly to the underlying material 140, a suitable lamination of films may be made so as to provide compatibility for bonding. For example, a composite film consisting of an outer fluorocarbon plastic layer and an inner polyvinylchloride layer provides a composite material which possesses the desired exterior characteristics of the fluorocarbon plastic film yet which is bondable to metal by virtue of the polyvinylchloride film layer on the inside. Other film compositions are however suitable for use within the general principles of the present invention.

Figure 20:
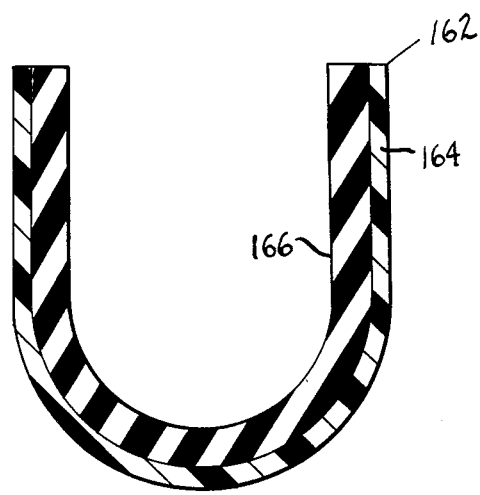
FIG. 20 is a transverse cross sectional view through another embodiment of edge guard.

FIG. 20 illustrates a still further embodiment of edge guard embodying principles of the present invention. The edge guard of FIG. 20 is designated by the general reference numeral 162, and it is illustrated to comprise a U-shaped cross section. As before, other cross sectional shapes are however possible using principles of the invention.

Edge guard 162 is preferably of entirely non-metallic character comprising an outer portion 164 and an inner portion 166. The outer portion 164 is preferably a material which provides desirable external characteristics such as color and abrasion resistance, and for this purpose a suitable example is a fluorocarbon plastic film such as the polyvinylfluoride film referred to above.

Inner portion 166 differs from certain of the other embodiments in that it is of a non-metallic material. Preferably it is an elastomeric composition having a resilient shock absorbing and cushioning characteristic to provide a shock absorbing capability beneath the outer portion 164. The particular material may be a rubber based composition or a suitable plastic material having the desired shock absorbing characteristics and compatibility for attachment with the outer film 164 and for bonding with an edge. The example illustrated comprises the outer portion 164 to be of a considerably smaller thickness than the thickness of the inner portion 166. It is believed that this will provide the best overall characteristics. For example, the thickness of inner portion 166 may be four or five times that of outer portion 164.

While it is possible that edge guard 162 could be self-retaining on a door edge, the preferred procedure for mounting the edge guard on an edge comprises the use of an additional attachment means. Any suitable means will do such as those described above, including the use of adhesive, chemical bonding, induction heating, ultrasonic bonding, etc.

The edge guard 162 may be constituted of materials which are endowed with an ability to conform to a contoured edge. This can be advantageous in that it is possible to eliminate procedures which are sometimes used with metal edge guards to conform them to particular edge contours.

Figure 21:
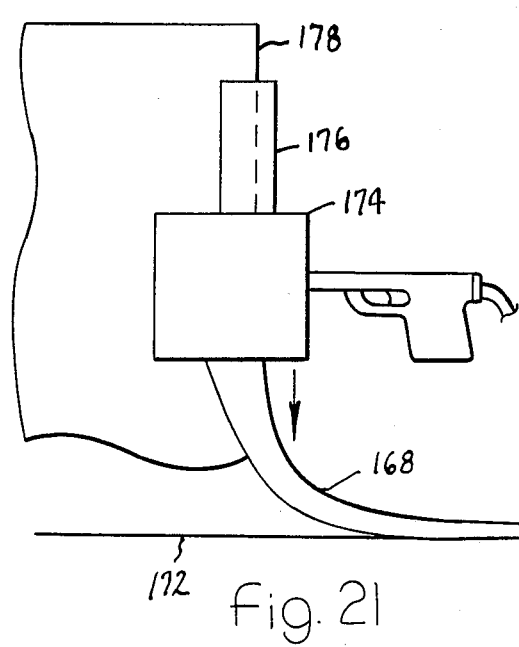
FIG. 21 is a procedure for installing the edge guard of FIG. 20.

FIG. 21 illustrates a procedure for applying edge guard 162 to a door edge. According to this procedure, the material which is to form the edge guard is provided in a flat strip form 168 from a roll 170. Where an adhesive is used to secure the edge guard on the door edge, the adhesive may be applied to the exposed face of portion 166 and covered by a release paper 172. As material is uncoiled from roll 170, the release paper 172 is stripped away by any suitable means so as to expose the adhesive material for application to the door edge.

FIG. 21 illustrates an installation tool 174 applying the material to the door edge. The tool is so constructed and arranged to conform the flat strip material into the generally U-shaped cross section as the tool is moved along the door edge. FIG. 21 shows the portion 176 of the edge guard to have already been formed by the tool as the tool is being moved downwardly along the door edge 178. The tool may be provided with a suitable means to cut the completed edge guard from the strip material after the desired length has been formed.

Thus in the installed condition, edge guard 162 presents the desired outward appearance by virtue of the colored outer portion 164 and it provides a shock absorbing characteristic by virtue of the inner portion 166. In this regard the importance of the shock absorbing material is that it provides not only a protective function for the door edge on which it is installed, but also protection for an object in its path when opened. For example, in a situation where another car is parked nearby, the opening of a door containing an insulated edge guard of the present invention is less likely to damage the adjacent car because of the shock absorbing character of the edge guard. This is an important feature for it means that other protective parts presently in use on cars, commonly referred to as body side moldings, can be eliminated.

These body side moldings comprise protective strips attached to the outside of the car body running along the length of the car. They are disposed generally at an outboard point so that if struck by an adjacent object such as the swinging door of an adjacent car, they would expectedly absorb the impact so that the car body itself is protected. Thus it can be seen that the present invention can have a significant benefit not only to the user but to others as well.

Figure 22:
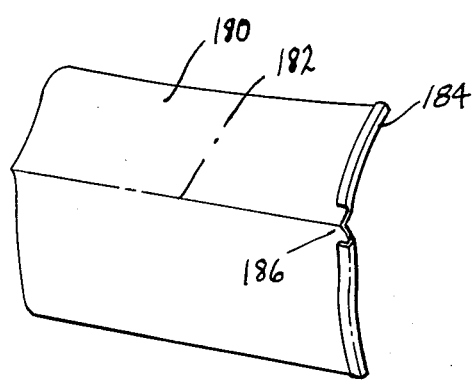
FIG. 22 is a side elevational view of an installed edge guard.
Figure 23:
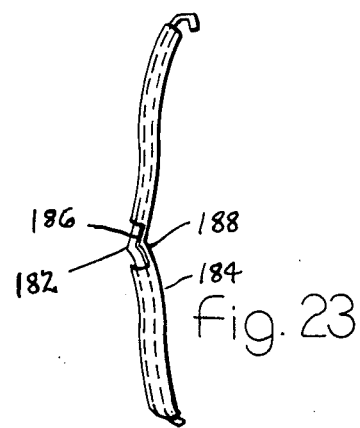
FIG. 23 is an end elevational view of FIG. 23.

FIGS. 22 and 23 illustrate a still further aspect of the invention. These figures illustrate a car door 180 containing a character styling line 182 imparted to the door. As can be seen in FIG. 23 this character line appears as a somewhat pointed edge, and it intersects the trailing door edge on which an edge guard 184 is installed. The use of character lines is desirable for exterior styling considerations.

With the present invention it is possible to readily conform an edge guard to a contoured trailing door edge intersected by a character line by providing a notch in the exterior of the edge guard at the vicinity of the intersection. As can be seen in these drawing figures, the edge guard conforms to the general contour of the door's trailing edge but where the character line intersects the door edge, the edge guard is provided with a notched out portion 186.

The illustrated notch 186 extends in the outer leg of the edge guard and into the U-shaped base. It will be appreciated that this shape of notch is merely examplary and that the exact dimensions and shape will depend upon the construction of the edge guard and the nature of the door edge and character line. Moreover, multiple notches may be provided for multiple character lines.

It is possible to provide this capability with the present invention because the edge guard may be endowed with an exterior color appearance matching the painted door. In other words, the provision of the notch on the outside will not be readily noticable. The residual material of the edge guard on the inner leg 188 opposite notch 186 provides a connecting structure between the portions of the edge guard on opposite sides of the character line. Thus the edge guard can be of a one piece construction rather than separate multiple pieces. Such a one piece construction obviously facilitates inventory, installation, and manufacturing procedures.

It is possible for the insulated edge guard with notch on the exterior for a character line to be of any of a number of possible constructions, such as those described above in this application. Even where the base material of an insulated edge guard is metallic or of a color somewhat different from the external color of the edge guard, a minimal amount of the non-matching color material is exposed along the edge of the notch and should not be objectionable. If there is an objection, it is possible to simply apply a dab of paint to the objectionable area matching the desired external color. It will be observed in FIG. 23 that the notch is also rendered less noticable to view because the upper edge of the notch faces downwardly and the lower notch edge upwardly toward the protruding character line itself.

One of the significant aspects of the invention which has been referred to above relates to the improved manufacturing economies which are obtained. Less material is used and less material must be inventoried in order to meet the requirements of customers. In the automotive industry it is difficult to ascertain beforehand the particular requirements for any given colors. Yet the automotive industry requires that suppliers have parts available to meet its production releases. With the present invention it is possible at the manufacturing sight of the edge guards to take the basic materials and fabricate the stock for use in making the edge guards to the customer's requirements. This can be done without the delays occasioned by having to order parts from another source. It eliminates or at least simplifies, the other procedures described above and it means that the edge guard manufacturer does not have to stock substantial inventories of materials to meet the customers' requirements. This benefits the customer and ultimately the consumer. For these reasons the invention is of importance not only by the inherent physical characteristics of the edge guard but also by virtue of procedures relating to the manufacture of such edge guards.

Figure 24:
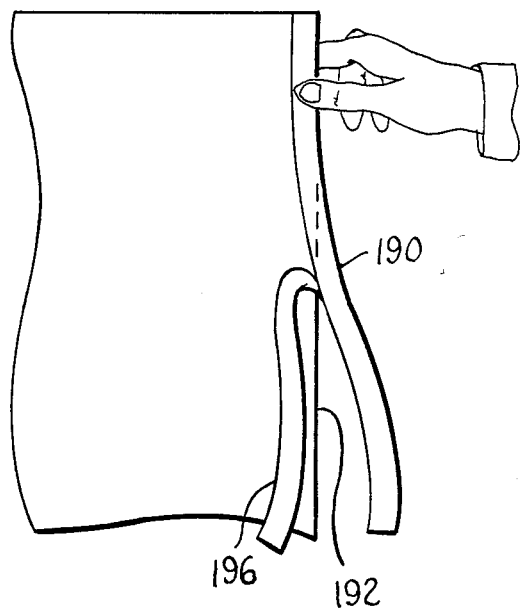
FIG. 24 is a fragmentary perspective view illustrating another application of edge guard to a door edge.

It is possible to facilitate the installation of an edge guard on a door edge by providing the edge guard with a base material which is pliable and can take a set. For example, the base material of the insulated strips shown in FIGS. 15 and 16 could comprise a thin metal foil say from 0.005 to 0.020 inches by way of example. The exact dimension will depend upon the material. The base is still encapsulated by the outer insulation but is itself pliable. The insulated strip may be formed into the desired cross section and due to the pliability and non-resiliency of its base material, it may be in effect pinched onto a door edge. FIG. 24 shows the start of the procedure. Such an edge guard is intended to be fully secured in place on the edge through the use of one of the various procedures described above, such as adhesive, chemical bonding, etc. By making the base material of a pliable soft material, such as for example a material having pliability and non-resilience like a thin sheet of lead, the installation process may be facilitated in the following manner.

The installer may take one end of the edge guard 190 and pinch it onto the door edge 192 as shown in FIG. 24. Because of the pliable base material the edge guard will remain in place. The rest of the edge guard may also be installed in the same manner, either manually or through use of a tool. One advantage of endowing the edge guard with a soft pliable base material capable of taking a set is that this can provide a temporary retention force which will allow the adhesive or other means of attachment to take effect. It should be recognized that some materials may require a certain amount of curing and/or must be subjected to certain temperatures before they become fully effective in bonding the edge guard.

It is possible for such soft pliable insulated edge guards to be fabricated either by extrusion and/or lamination procedures. Which particular procedure is to be used in any given instance will depend upon the nature of the materials involved and the requirements for the door and edge guard.

Figure 25:
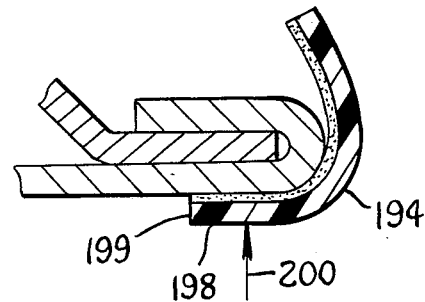
FIG. 25 and 26 are transverse cross sectional views through a further embodiment of edge guard illustrating respective steps in a procedure for applying the edge guard to the door edge.
Figure 26:
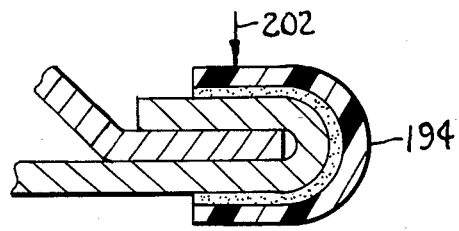

FIGS. 25 and 26 illustrate further details of the procedure. The edge guard material may come in a flat strip 194. The release paper 196 has been previously removed from the one surface of the strip to expose the adhesive material. One longitudinal marginal edge of the strip 194, for example the marginal edge 198, is placed against one side of the door edge and a force indicated by the arrow 200 is applied thereto. The longitudinal end 199 of marginal edge 198 provides for accurate alignment of the edge guard through any of a number of possible alignment procedures. For example, a scribe line or other type of line could be provided on the door edge with which the end 199 of edge 198 is aligned. Another possibility is for a body fixture to be associated with the door to provide an edge against which end 199 may be disposed.

The procedure is continued by wrapping the material 194 around the end of the door edge onto the opposite side. Pressure is applied to this opposite side as indicated by the arrow 202. The entire length of the marginal edge of the strip may be adhered to one side of the door edge before the wrapping around occurs, or the procedure may be conducted progressively along the length of the edge guard. The final construction comprises an edge guard which is tightly and securely wrapped onto the door edge and because of the nature of the edge guard material it is possible for the edge guard to be conformed readily to the door contour without the use of further tools and/or procedures. Tools however may be used if desired.

Figure 27:
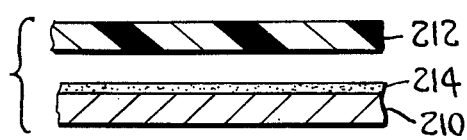
FIG. 27 is a fragmentary transverse cross sectional view, in separated form, illustrating another aspect of edge guard construction.

FIG. 27 illustrates a further aspect of the invention insofar as the fabrication of an insulated strip is concerned. FIG. 27 shows the construction in the form of a strip of metal 210 and the insulating layer 212. The fabrication procedure involves the application of a glue layer 214 to one side of metal strip 212. The glue is carried by a solvent and the glue-carrying solvent is applied in a liquid-like form to strip 210 and can be allowed to dry. Insulator 212 comprises a plastic material, and glue 214 is compatible with the materials of insulator 212 and strip 210 for bonding of the former to the latter. The glue is a heat activated glue for example, one which will flash at a temperature in the range of 275° F. to 350° F. by way of example. The melting point of the insulator 212 is greater than the flash point of the glue.

The material 212 is received hot from an extruder, in the preferred practice of the invention, and base 210 and glue 214 are themselves heated. The extruded insulating material 212 and the heated glue 214 and metal, 210 are pressed together by running the extruded material and the glue-containing metal strip through a series of one or more pressure rolls. The rolls which apply the pressure may comprise heated and non-heated ones. The temperature is such that the glue is activated by the heat present in both the plastic and metal so that the insulator material 212 becomes bonded to base 210. The laminate thus formed is run through a cooling tank of water. This creates a permanent, flawless bond between the insulator and base metal, which can be steel or aluminum, for example.

Figure 28:
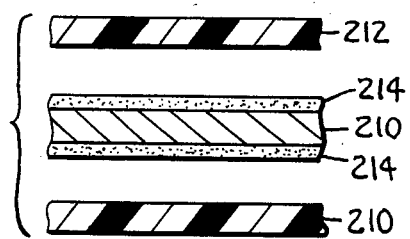
FIG. 28 is a view similar to FIG. 27 illustrating a further constructional aspect.

FIG. 28 illustrates a procedure where insulating layers 212 are applied to both sides of base 210. The application of the respective insulating layers may be done concurrently or sequentially, but each is applied in the same manner as that described above in connection with FIG. 27.

The resultant material contains the properties of the metal and the insulator which are desired in the edge guard when the insulated strip is formed into the cross sectional shape for the edge guard.

For certain insulating materials the above procedure may not be suitable because those materials cannot withstand elevated temperatures such as those mentioned above.

Figure 29:
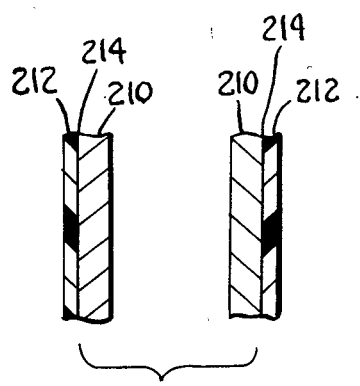
FIG. 29 is a view similar to FIG. 27 illustrating yet another constructional aspect.

FIG. 29 illustrates a procedure for making an insulated edge guard with these other types of materials. In this embodiment the plastic is a cast material which is not heated. Glue, 214 is applied to a surface of the metal strip 210 and the strip and glue are raised to an elevated temperature while the plastic 212 is not. The insulator and the metal are run through a series of rolls applying pressure to cause the two to become bonded into a permanent and flawless bond.

If it is desired to have a construction in which insulating material is on both sides, two such strips may be placed back to back with their metal portions confronting each other and joined together at their confronting surfaces. It is not possible to apply heat to the laminated sides of the strip because this would have a damaging effect on the insulating material. By way of example, certain materials which are damaged by elevated temperatures are fluoridated plastic films such as that referred to above, and these may be applied either directly or in a laminated form to the metal strip. An example of such laminated form is the polyvinylfluoride, polyvinylchloride laminated plastic film with the polyvinylchloride layer being applied to the metal through the glue with the polyvinylfluoride presenting the desired exterior characteristics.

The use of pliable material in conjunction with insulation is advantageous because attempts to apply film by itself to the door edge are difficult to control because of the flimsy nature of the film. The pliable material, either metal or plastic, gives stability or rigidity for alignment, forming or installation, following the contour of the trailing edge of the swinging closure and enabling the installer to exert pressure, realizing a perfect fit due to the fact that the film without a support would be very difficult to handle and install.

While a preferred embodiment has been disclosed, it will be appreciated that principles are applicable to other embodiments.

What is claimed is:

1. In the method of making an edge guard of generally U-shaped cross section having a metal base portion encapsulated by an insulating material, the steps of providing a flat strip of metal and a strip of insulating material, bonding the insulating material to one face of the metal strip, folding the sides of the insulating material around the side edges of the metal strip and adhering them onto the opposite face of the metal strip to form a seam such that said opposite face is substantially covered with insulating material and then forming the insulated strip thus formed into a generally U-shaped cross section with the seam disposed on the interior of the U-shaped cross section.

2. The method set forth in claim 1 in which the width of the strip of insulating material is such that the seam thereof comprises the edges of the strip in overlapping relation with each other.

3. An edge guard made by the method of claim 1.

4. An edge guard made by the method of claim 2.

5. In a vehicle door having a character line extending generally horizontally along the door, said character line comprising in cross section, an outwardly extending protuberance intersecting a trailing edge of the door and in which said trailing edge has a contour, an edge guard for fitting onto said trailing edge, said edge guard having a generally U-shaped cross section with inner and outer legs joined by a generally semi-circular base and including a notch in said outer leg at the intersection of said character line and said trailing edge, said notch comprising an upper edge spaced above said character line and a lower edge spaced below said character line, said character line having a crown protruding outwardly beyond said notch, said notch extending into said semi-circular base so as to provide clearance for the protrusion of said crown, and the edge guard comprising a connecting section joining portions of the edge guard above and below the notch along said inner leg.

6. An edge guard comprising a base of pliable, non-resilient material having the pliability of lead capable of taking a set and an insulating material covering said base material, said edge guard being formed into a generally U-shaped cross section for application to a trailing edge of a swinging closure, said insulating material serving to insulate the base material from the swinging closure's trailing edge.

7. An edge guard as set forth in claim 6 in which said strip of pliable non-resilient material is a metal having the pliability of lead.

8. An edge guard as set forth in claim 7 in which the edge guard is formed in situ on the edge.

9. An edge guard as set forth in claim 8 in which said edge guard is applied by means of a tool and including the use of adhesive material for adhering the edge guard onto the edge.

10. In the method of making an edge guard of generally U-shaped cross section having a metal base portion encapsulated by an insulating material, the steps of providing a flat strip of metal and insulating material which is applied to one face of the metal strip and extends around the side edges of the metal strip and into the opposite face of the metal strip at least along substantial portions of the margins of said opposite face of the metal strip and then forming the insulated strip thus formed into a generally U-shaped cross section so that insulating material is disposed at the points where the legs will bear against an edge when the edge guard is installed on an edge.

11. An edge guard made by the method of claim 10.

* * * * *